(12) United States Patent
Shaw

(10) Patent No.: US 10,484,493 B2
(45) Date of Patent: Nov. 19, 2019

(54) METHOD AND APPARATUS FOR COMMUNICATING MESSAGES

(71) Applicant: AT&T INTELLECTUAL PROPERTY I, LP, Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 518 days.

(21) Appl. No.: 14/943,886

(22) Filed: Nov. 17, 2015

(65) Prior Publication Data

US 2017/0142211 A1    May 18, 2017

(51) Int. Cl.
*H04L 29/08* (2006.01)
*H04W 4/14* (2009.01)

(52) U.S. Cl.
CPC .............. *H04L 67/24* (2013.01); *H04W 4/14* (2013.01)

(58) Field of Classification Search
CPC ................................. H04L 67/24; H04W 4/14
USPC ....................................................... 709/206
See application file for complete search history.

(56) References Cited

U.S. PATENT DOCUMENTS

| | | | |
|---|---|---|---|
| 6,279,018 B1 | 8/2001 | Kudrolli et al. |
| 6,463,462 B1 | 10/2002 | St. Clair et al. |
| 6,795,822 B1 | 9/2004 | Matsumoto et al. |
| 7,398,203 B2 | 7/2008 | Corston-Oliver et al. |
| 7,502,732 B2 | 3/2009 | Mathur et al. |
| 7,827,315 B2 | 11/2010 | Kirkland et al. |
| 7,865,560 B2 | 1/2011 | Rohall et al. |
| 7,886,012 B2 | 2/2011 | Bedi et al. |
| 8,176,420 B2 | 5/2012 | Lekutai et al. |
| 8,209,617 B2 | 6/2012 | Vanderwende et al. |
| 8,423,623 B2 | 4/2013 | Li et al. |
| 8,560,623 B2 | 10/2013 | Jensen et al. |
| 8,620,641 B2 | 12/2013 | Farnsworth et al. |
| 8,645,430 B2 | 2/2014 | Khouri et al. |
| 8,645,471 B2 | 2/2014 | Onyon et al. |
| 8,868,670 B2 | 10/2014 | Nenkova et al. |

(Continued)

FOREIGN PATENT DOCUMENTS

| | | |
|---|---|---|
| WO | 199965256 | 12/1999 |
| WO | 2015047377 A1 | 4/2002 |
| WO | 2014058433 | 4/2014 |

OTHER PUBLICATIONS

Carenini, Giuseppe et al., "Methods for mining and summarizing text conversations", Synthesis Lectures on Data Management 3.3, 2011, 1-130.

(Continued)

*Primary Examiner* — Minh Chau Nguyen
(74) *Attorney, Agent, or Firm* — Guntin & Gust, PLC.; Atanu Das

(57) ABSTRACT

Aspects of the subject disclosure may include, for example, receiving user input including a first message and identification information associated with a recipient that is intended to receive the first message, generating a second message by adjusting a first message according to a first attention span determined from activity information of a recipient, and transmitting the second message to a receiving device to enable the receiving device to generate a third message by adjusting the second message according to a second attention span determined by the receiving device for the recipient. Other embodiments are disclosed.

20 Claims, 7 Drawing Sheets

(56) References Cited

U.S. PATENT DOCUMENTS

| | | | |
|---|---|---|---|
| 9,015,153 | B1 | 4/2015 | Zhang |
| 9,059,870 | B1* | 6/2015 | Sobel ................... H04L 51/066 |
| 9,082,110 | B2 | 7/2015 | Hamburg |
| 9,087,324 | B2 | 7/2015 | Osipkov et al. |
| 2003/0003931 | A1 | 1/2003 | Silventoinen et al. |
| 2006/0194595 | A1* | 8/2006 | Myllynen ......... H04L 29/06027 455/466 |
| 2008/0155080 | A1* | 6/2008 | Marlow .................. H04L 12/66 709/223 |
| 2009/0111433 | A1* | 4/2009 | Muhonen ................ H04L 51/38 455/414.1 |
| 2009/0271486 | A1* | 10/2009 | Ligh ................... G06F 3/04886 709/206 |
| 2011/0116610 | A1* | 5/2011 | Shaw ...................... H04W 4/18 379/88.04 |
| 2011/0172989 | A1 | 7/2011 | Moraes et al. |
| 2011/0191768 | A1* | 8/2011 | Smith .................... G06F 9/445 717/176 |
| 2011/0208816 | A1 | 8/2011 | Chavez et al. |
| 2011/0208822 | A1* | 8/2011 | Rathod .................. G06Q 30/02 709/206 |
| 2011/0276396 | A1* | 11/2011 | Rathod ............. G06F 17/30867 705/14.49 |
| 2011/0296034 | A1* | 12/2011 | Mayer ................... H04M 7/128 709/227 |
| 2011/0313756 | A1 | 12/2011 | Connor et al. |
| 2012/0136939 | A1 | 5/2012 | Stern et al. |
| 2013/0268839 | A1 | 10/2013 | Lefebvre et al. |
| 2013/0316746 | A1* | 11/2013 | Miller ..................... H04L 51/30 455/466 |
| 2014/0082104 | A1 | 3/2014 | Mann |
| 2014/0378174 | A1 | 12/2014 | Rosen et al. |

OTHER PUBLICATIONS

Carenini, Giuseppe et al., "Summarizing Emails with Conversational Cohesion and Subjectivity", ACL. vol. 8, 2008.

Dredze, Mark et al., "Generating summary keywords for emails using topics", Proceedings of the 13th international conference on Intelligent user interfaces. ACM, 2008.

Gardner-Stephen, P. et al., "Improving Compression of Short Messages", Network and System Sciences, vol. 6 No. 12, 2013, 497-504.

Lima, et al., "Automatic sentiment analysis of Twitter messages", Computational Aspects of Social Networks (CASoN), 2012 Fourth International Conference, Nov. 2012, 21-23, 52-57.

Sriram, Bharath et al., "Short text classification in twitter to improve information filtering", Proceedings of the 33rd international ACM SIGIR conference on Research and development in information retrieval, 2010.

Zajic, David M. et al., "Single-document and multi-document summarization techniques for email threads using sentence compression", Information Processing & Management, vol. 44, Issue 4, 2008, 1600-1610.

Zhou, Liang et al., "Digesting virtual geek culture: The summarization of technical internet relay chats", Proceedings of the 43rd Annual Meeting on Association for Computational Linguistics. Association for Computational Linguistics, 2005.

* cited by examiner

100

300

600

METHOD AND APPARATUS FOR COMMUNICATING MESSAGES

FIELD OF THE DISCLOSURE

The subject disclosure relates to a method and apparatus for communicating messages.

BACKGROUND

People's lives are becoming increasingly fast-paced and multi-tasking is becoming more prevalent. As a result, their attention span can become shorter and they often have limited time to concentrate, resolve, and digest information.

BRIEF DESCRIPTION OF THE DRAWINGS

Reference will now be made to the accompanying drawings, which are not necessarily drawn to scale, and wherein.

DETAILED DESCRIPTION

Figure 1:
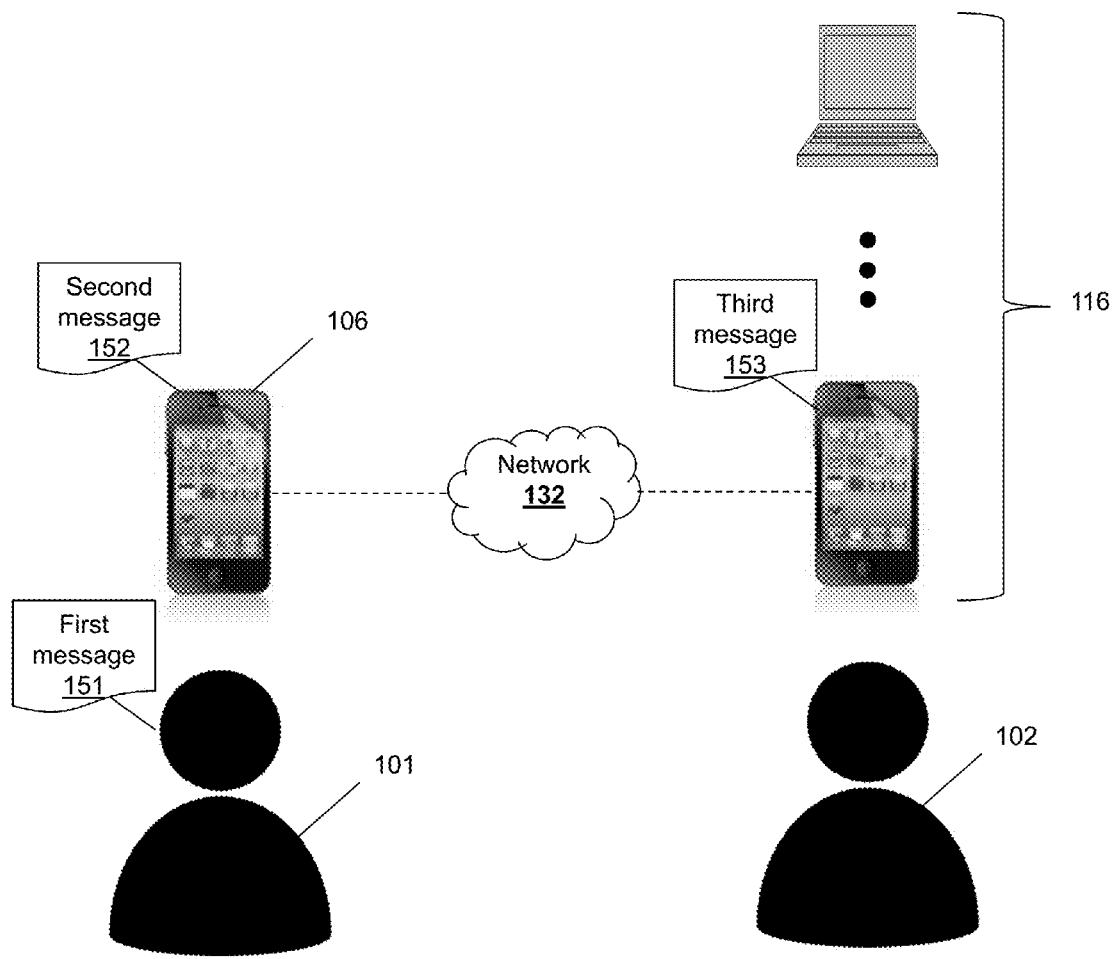
FIGS. 1-3 depict illustrative embodiments of systems for adjusting and delivering messages.

The subject disclosure describes, among other things, illustrative embodiments for communicating messages to recipients where the messages are in a desired form based on the particular circumstances. An original message can be adjusted, including changing format, changing words, or otherwise adjusting the message based on various factors. An attention span of the intended recipient can be determined or otherwise predicted based on monitored activities of the recipient, preferences of the recipient, and/or a history of communications associated with the recipient. Based on the determined attention span of the recipient, the original message can be modified. The modification of the message can be performed by various devices or combinations of devices, including the sending device, the receiving device and/or a network device(s). Other embodiments are described in the subject disclosure.

One or more aspects of the subject disclosure include a sending device having a processor and a memory that stores executable instructions that, when executed by the processor, facilitate performance of operations including receiving user input including a first message and identification information associated with a recipient user that is intended to receive the first message. The processor can obtain activity information and presence information associated with the recipient user and can determine a first attention span of the recipient user according to the activity information. The processor can generate a second message by adjusting the first message according to the first attention span. The processor can select a receiving device from among a group of devices according to the presence information. The processor can transmit the second message to the receiving device to enable the receiving device to generate a third message by adjusting the second message according to a second attention span determined by the receiving device for the recipient user, where the third message is presentable by the receiving device.

One or more aspects of the subject disclosure are a method including receiving, by a network server from a sending device, a first message and identification information associated with a recipient user that is intended to receive the first message. The method includes obtaining, by the network server, network status information indicating network conditions for communications directed towards a receiving device of the recipient user. The method includes obtaining, by the network server, activity information associated with the recipient user. The method includes determining, by the network server, a first attention span of the recipient user according to the activity information. The method includes generating, by the network server, a second message by adjusting the first message according to the first attention span. The method includes selecting, by the network server, a format for the second message according to the network conditions. The method includes transmitting, by the network server, the second message to the receiving device to enable the receiving device to generate a third message by adjusting the second message according to a second attention span determined by the receiving device for the recipient user, where the third message is presentable by the receiving device, and where the transmitting of the second message to the receiving device is in the selected format.

One or more aspects of the subject disclosure include a machine-readable storage medium, comprising executable instructions that, when executed by a processor of a receiving device, facilitate performance of operations, including receiving a second message that is generated from user input, activity information, and a first attention span, where the user input is received at a sending device and includes a first message, where the activity information is associated with a recipient user of the receiving device, where the first attention span is determined for the recipient user according to the activity information, and where the first message is adjusted into the second message according to the first attention span. The processor can receive metadata representing changes made to the first message in the generating of the second message. The processor can determine a second attention span for the recipient user. The processor can generate a third message by adjusting the second message according to the second attention span and the metadata. The processor can present the third message.

FIG. 1 depicts an illustrative embodiment of a system 100 for message communication between a sender 101 and a recipient 102 (which can be any number of recipients). Sender 101 can have a sending device 106, such as a mobile phone or any other end user device capable of communicating a message including a laptop, a set top box, a vehicle computing system, and so forth. The sending device 106 can obtain a first message 151 that is directed to the recipient 102. The first message 151 can be any type of message in any format, including text, video and/or audio.

The sending device 106 can obtain identification information associated with the recipient 102, such as the recipient's name, telephone number, MAC address of equipment of the recipient, and so forth. For example, the sender 101 may record a voice message 151 that is to be transmitted to the recipient 102 and the voice message may include a name of the recipient which can be compared with an electronic contact book that stores additional identification information for the recipient, including identification information for a group of receiving devices 116 of the recipient. Other techniques can be utilized by sending device 106 for capturing first message 151 including video recording, text input, recognizing device movement that is correlated to particular message types or other information, and so forth.

In one embodiment, sending device 106 can determine a first attention span associated with recipient 102. This determination can be made according to various factors, such as activity information for the recipient 102 including current activity that the recipient is engaged in, scheduled activity for the near future, a current location, a scheduled location, a current communication session, a scheduled communication session, and so forth. As an example, the sending device 106 can access, or otherwise request information from, an electronic calendar of the recipient 102 to detect current and future activities.

The first attention span of the recipient 102 can be determined according to other factors, such as determining a short attention span during jogging based on a preference supplied by the recipient that messages are to be in text format under ten words when the recipient is jogging. Other factors can include monitoring other messages received by or from the recipient 102, such as according to authorization of parties to the messages. For instance, the sending device 106 can detect that in the past hour the recipient 102 has sent out six messages that were all in SMS format and under ten words. Based on this detection, the sending device 106 can determine that the recipient 102 presently has a short attention span and messages should be in text format under ten words. In another embodiment, the sending device 106 can detect that in the past hour the recipient 102 has only responded to messages in a particular format that were under a particular number of words. Based on this detection, the sending device 106 can again determine that the recipient 102 presently has a short attention span. The monitoring or other obtaining of activity information of the recipient 102 can be performed in various ways including by obtaining information directly from devices 116 of the recipient 102 (e.g., sending a request for information) and/or by obtaining information from other devices, such as network devices providing communication services to the devices 116.

In one embodiment, the sending device 106 can adjust the first message 151 according to the determined first attention span to generate a second message 152. The adjustment can include deleting words, replacing words, and/or changing a format (e.g., changing a voice message to a text message or vice versa). In one embodiment, the adjustment can include applying a natural language engine to a text version of the first message 151 to determine a theme of the message, parties identified in the message, and/or actions described in the message. In another embodiment, irrelevant information (which can be removed from the message) can be determined according to the determination of the theme of the first message 151. In one embodiment, word replacement can be performed by replacing words in the first message 151 with words that have been used by the recipient 102 in previous messages sent by the recipient, such as replacing the word "employees" with "team" or replacing the term "problem" with "issue" in the generated second message 152. In one embodiment, the first message 151 can be a text message and the replacement of the word(s) can be of the corresponding text. In another embodiment, the first message 151 can be an audio message and the replacement of the word(s) can be of the corresponding audio such as using a synthesized voice or recorded voice of the sender 101 when generating the second message 152. In one embodiment, the first and second messages 151, 152 can maintain the same theme, identified parties, and/or actions.

In one embodiment, the sending device 106 can identify a device or a number of devices from among the recipient's devices 116 that should receive the generated second message 152. For example, presence information and/or activity information for the recipient 102 can be obtained and analyzed to identify a device or devices that are most likely to be viewed (or answered) by the recipient 102. For example, the sending device 106 can generate a second message 152 that includes a meeting place for dinner. The sending device 106 can detect that the recipient 102 has his or her cell phone with them and that the cell phone is presently moving at approximately 50 mph along a highway. The sending device 106 can further determine, from calendar information obtained from an electronic calendar, that the recipient 102 has a business meeting in a neighboring town twenty miles from the recipient's current location which is scheduled to occur in an hour. Based on all of this information, the sending device 106 can determine that a vehicle communication system of the recipient should receive the generated second message 152 which identifies the meeting place for dinner and that the second message should be in an audio format rather than a text message. The second message 152 can then be transmitted over a network 132 to the selected device(s) 116 of the recipient 102. In one embodiment, multiple devices 116 of the recipient 102 can receive the second message 152 which may be in the same or different formats and/or which can be identical second messages or different second messages (which maintain the same them, parties and/or actions).

Once the second message 152 is received by the receiving device 116, it can be rendered or it can be further adjusted. For example, the receiving device 116 can determine a second attention span for the recipient 102 and can generate a third message 153 by adjusting the second message 152 according to the second attention span. In this embodiment, the receiving device 116 can obtain activity information (which may or may not be the same as the activity information obtained by the sending device 106) and can determine the second attention span of the recipient 102 according to the activity information. In one embodiment, the receiving device 116 can monitor incoming and outgoing messages at the receiving device to determine that the recipient 102 needs to perform a large number of tasks in a limited amount of time. In one embodiment, based on this monitoring, as well as determining from the subject matter of the incoming and outgoing messages that the nature of the tasks is highly complicated, the receiving device 116 can determine that the recipient presently has a short attention span. This short attention span can then be the basis for the receiving device 116 further modifying the second message 152 to generate the third message 153.

In one embodiment, the receiving device 116 can receive metadata representing changes made to the first message 151 in the generating of the second message 152. Based on the metadata, the receiving device 116 can generate the third message 153. For example, the second message 152 may have been generated and removed reference to a location for a meeting that was included in the first message 151. The receiving device 116 can determine the second attention span of the recipient 102 is medium (as compared to the determination of a short first attention span of the recipient by the sending device 106 which caused the location of the meeting to be removed from the second message 152). In this example, the location of the meeting can be added back into the third message 153 by the receiving device 116 which is then presented by the receiving device.

In one or more embodiments, the metadata provided by the sending device 106 to the receiving device 116 can include the determination by the sending device of the first attention span of the recipient 102. In another embodiment, the receiving device 116 can compare the first attention span determination to the second attention span determination as a factor in generating the third message 153, such as for increasing or decreasing a number of words in the message, a length of the message, a format to be used in presenting the message, and so forth.

In one or more embodiments, system 100 enables presentation of a message that is a chirp (e.g., an adjusted version of a longer message). For instance, the chirp can be a single or plurality of extremely-short pieces of messages including audio (e.g., 1 minutes or less), video (e.g., 5 seconds or less), and/or text (e.g., 50 characters or less); although other sizes of messages can also be utilized. In one embodiment, the chirp can be instantaneously defined by the user and/or the network. In another embodiment, the chirp can be instantaneously organized, shared, broadcast, concatenated (e.g., stitched together) and/or disassembled by the user and/or the network. In one embodiment, the chirp can adapt to network conditions (e.g., congestion) and be transmitted through the congested network via adaptation (e.g., from video to image, or from voice to text).

In one embodiment, the chirp can instantaneously capture "Life in a Nutshell." For instance, the chirp may only retain the most important piece of the original message (e.g., family member's last words). In this example, the chirp may instantaneously ignore everything else (e.g., words or actions deemed non-significant). In one embodiment, the chirp can be used for person-to-person communications, storage and/or retrieval. In one embodiment, the chirp can be used in social networking. In one embodiment, the chirp can be used for emergency alert communications. In one or more embodiments, the chirp can be user definable or customizable. For example, a user can select and change the media types she/he wishes to keep. In another example, a user can adjust the length of the media on each selected type.

Figure 2:
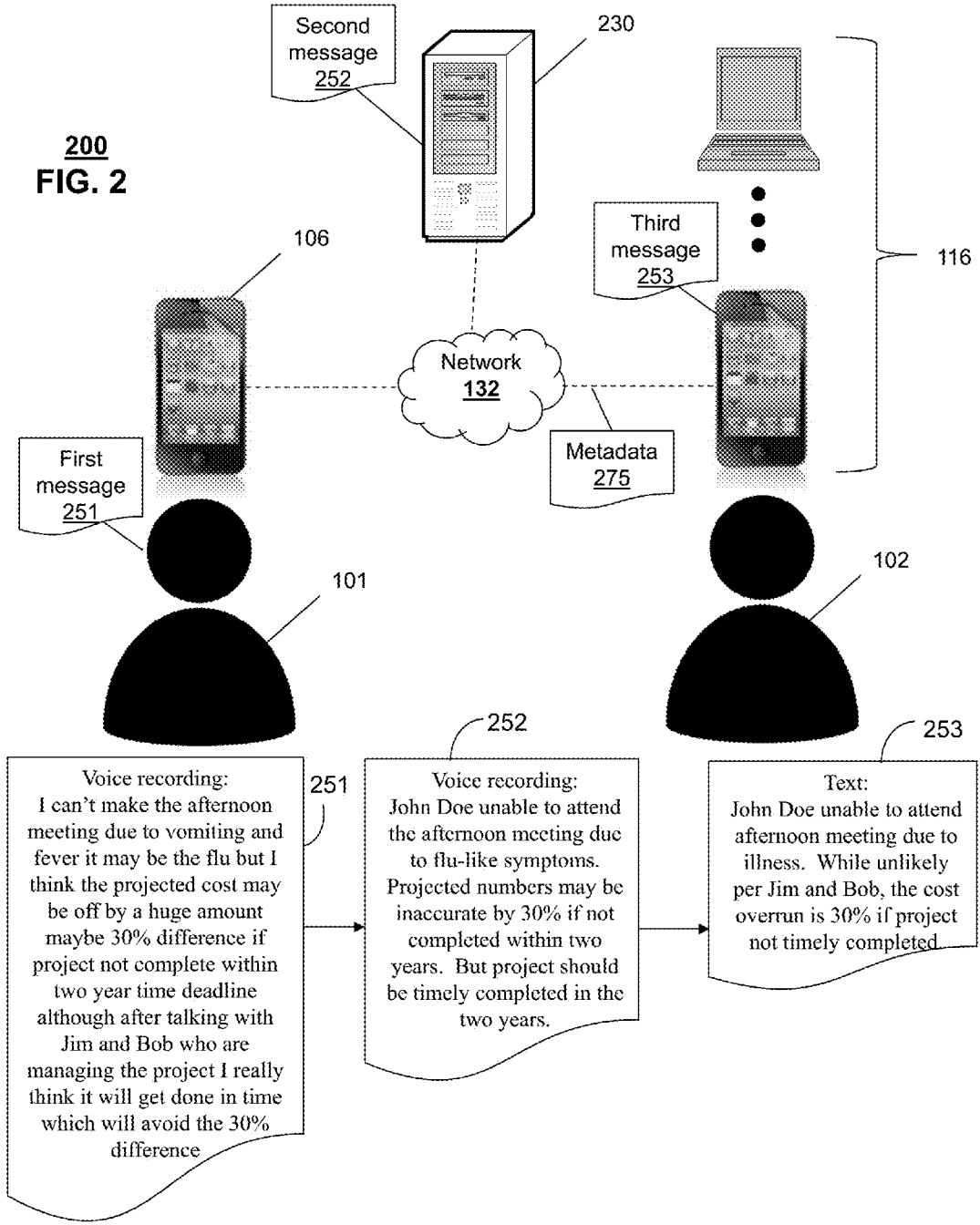

FIG. 2 depicts an illustrative embodiment of a system 200 that can be utilized for communicating messages from the sender 101 to one or more of the recipients 102 (only one of which is shown). System 200 can include a sending device 106 of the sender 101 and one or more receiving devices 116 of the recipient 102, where communications (including wireless and/or wired communications) can be transmitted and received over a network(s) 132 which can be various types of network(s) utilizing various communication protocols.

System 200 enables a first message 251 to be captured or otherwise obtained by the sending device 106 and then adjusted into a second message 252 which may or may not be further adjusted into a third message 253 (e.g., where the receiving device 116 presents received messages without further analysis or where the receiving device analyzes the second message but makes no changes). In one embodiment, the first message 251 can be transmitted to the network server 230 without adjustment (e.g., capturing a text, audio or video message at the sending device 106 and transmitting the captured message). In another embodiment, the first message 251 can be transmitted to the network server 230 after adjustment, such as capturing an audio message at the sending device 106 and transmitting a text version of the captured audio. The sending device 106 may or may not make other adjustments to the captured message, such as replacing words with preferred words.

In one embodiment, the adjustment of the first message 251 to generate the second message 252 can be performed by a network server 230. For example, the network server 230 can receive, from the sending device 106, the first message 251 along with identification information associated with the recipient 102 that is intended to receive the first message. In one embodiment, the network server 230 can obtain network status information indicating network conditions (e.g., network traffic, network resource usage, network detected faults, and so forth) for communications directed towards the receiving device 116 of the recipient 102. In one embodiment, the network server 230 can obtain activity information (e.g., active or scheduled communication sessions, active or scheduled meetings, and so forth) associated with the recipient 102. The network server 230 can determine a first attention span of the recipient 102 according to the activity information and can generate the second message 252 by adjusting the first message, such as according to the first attention span. In one embodiment, the network server 230 can select a format for the second message 252 according to the network conditions (e.g., converting a video message to a text message when high traffic conditions are detected). In one embodiment, the network server 230 can transmit the second message to the receiving device 116 to enable the receiving device to present the second message 252 or to generate a third message 253 by adjusting the second message according to a second attention span determined by the receiving device 116 for the recipient 102.

In one embodiment, the second message 252 can be given priority routing status by other network device along the communication path, where the priority routing status is provided responsive to the second message being converted to a more efficient transport format, such as conversion from a video message to an audio message or a text message which are more resource efficient to transport. In one embodiment, the network server 230 can generate metadata 275 representing changes made to the first message 251 in the generating of the second message 252. The network server 230 can transmit the metadata 275 to the receiving device 116, where the generating of the third message 253 (or a determination not to adjust the second message 252) by the receiving device is based on the metadata.

In one embodiment, the network server 230 can provide, to the receiving device 116, access data indicating available access to the first message 251. Responsive to the access data, the network server 230 and/or the sending device 106 can receive a request from the receiving device 116 to access the first message 251. The network server 230 and/or the sending device 106 can transmit the first message 251 to the receiving device 116 responsive to the request. In one embodiment, the generating of the second message 252 can include adjusting the first message 251 according to words utilized in a previous message transmitted by the sending device 106 to the receiving device 116. In one embodiment, the obtaining of the activity information by the network server 230 can include obtaining calendar information for an electronic calendar associated with the recipient user and/or monitoring for an active communication session associated with equipment of the recipient user (e.g., subject to pre-authorization by parties involved).

FIG. 2 further illustrates an example of message adjustment being performed in system 200. First message 251 can be a voice recording indicating that the user has particular symptoms and is thus unable to make a meeting. The first message 251 further describes details regarding a projected cost difference. The network server 230 can determine a first attention span of the recipient 102 (e.g., according to monitored activity information for the recipient) and can adjust the first message 251 to generate the second message 252. The particular adjustments made in this example when generating the second message 252 include identifying the author of the message (rather than simply stating "I"); removing details of the illness (by replacing with the term "flu-like symptoms"); and simplifying the description of the possible inaccuracy in the projected numbers while also removing citation to "Jim and Bob."

Continuing with this example, the receiving device 116 can determine a second attention span of the recipient 102 (e.g., according to monitored activity information for the recipient which may or may not be the same activity information accessible to the network server 230) and can adjust the second message 252 to generate the third message 253. The particular adjustments made in this example when generating the third message 253 include further removing details of the illness (by removing "flu-like symptoms"); and simplifying the description of the possible inaccuracy in the projected numbers while also adding back in the citation to "Jim and Bob" as the source of the timeliness for completion of the project. In this example, the receiving device 116 can receive the metadata 275 from which the changes between the first and second messages 251, 252 can be detected and which can be the basis of the reintroduction of the sources of the timeliness for completion of the project. In this example, third message 253 is not merely a shortening of the second message 252, but rather removing terms determined to be unnecessary (e.g., according to a determined second attention span of the recipient 102) while also reintroducing other terms that are deemed to be necessary (e.g., identifying the managers of the project as the source of a timely completion).

Figure 3:
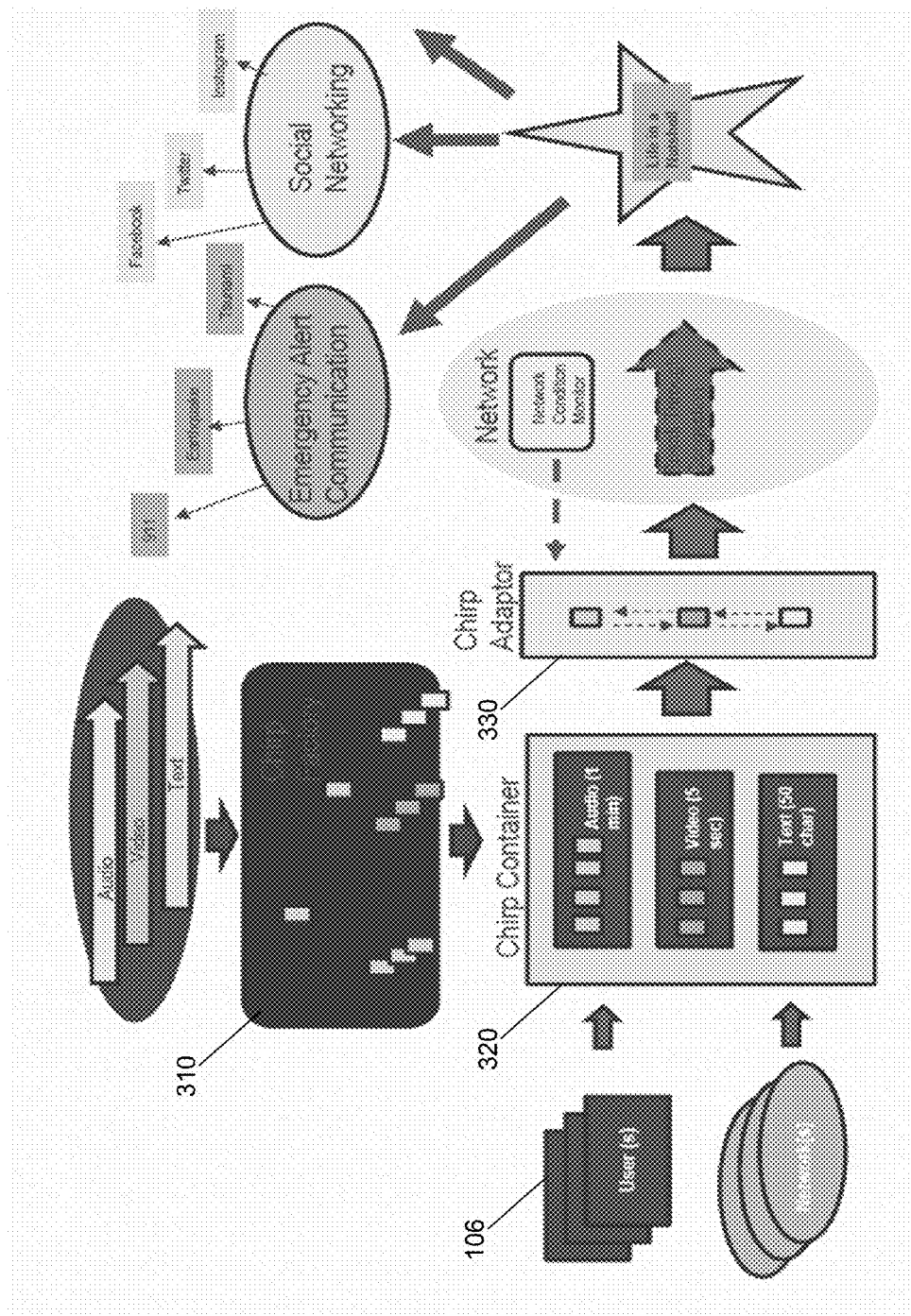

FIG. 3 depicts an illustrative embodiment of a system 300 that can be utilized for communicating messages from users 101 to recipients. System 300 enables users to distribute customized concise messages via various platforms including directly to receiving device and/or through social networking applications. Network conditions can be monitored and adjustments can be made to the messages that enable delivery, such as obtaining priority transmitting status (e.g., positioned at head of queue by a router) when the message meets size and/or format thresholds (e.g., SMS text message under ten words that does not include any graphics or audio).

In one embodiment, system 300 enables messages to be generated automatically by a message engine 310 (e.g., executed by a sending device or executed by a network device). As an example, the message engine 310 can have access to preferred words, sample audio recordings, sample video or other content from which the message can be generated. For instance, a sender (e.g., Sarah) can request (via user input) that a message be sent to five particular recipients. The user input can identify those recipients by name and can further provide details for the message such as an invitation to go see one of four movies that are playing at different times at the local movie theatre that evening. The message engine 310 can generate a voice synthesized message indicating that "Sarah invites you and friends to see a movie tonight." The particular words used for generating the message cam be chosen as a combination of words in the user input (e.g., movie), as well as other words that are preferred terms or otherwise more succinct terms associated with the words in the user input.

A message container 320 can be utilized for storage, in whole or in part, of messages (e.g., messages generated by message engine 310 and/or original messages in the user input) so that these messages are later accessible. A message adaptor 330 (e.g., executed by a sending device or executed by a network device) can be employed to further refine or otherwise adjust the message, such as based on network conditions, activity information associated with the recipient(s), or other factors. The adjusted message can then be provided to the recipient(s), including to receiving devices of the recipients and/or via social networking applications.

Continuing with the above-described example, the movie invitation may be further adjusted so that it is posted to a social network website responsive to a determination that all of the recipients are part of the same social networking group. Other techniques for delivery of the message can be utilized including combinations of techniques, such as SMS messages to mobile devices of each of the recipients in combination with a posting at a social network website.

In one or more embodiments, the system 300 can enable detecting portions of a message that are deemed significant, concatenating those significant portions into the adjusted message, and storing the adjusted message at the message container 320 for later access by the recipient(s) and/or the sender. In one or more embodiments, the message can include or can be associated with emergency alert communications, such as warning messages of an emergency event that is occurring.

Figure 4:
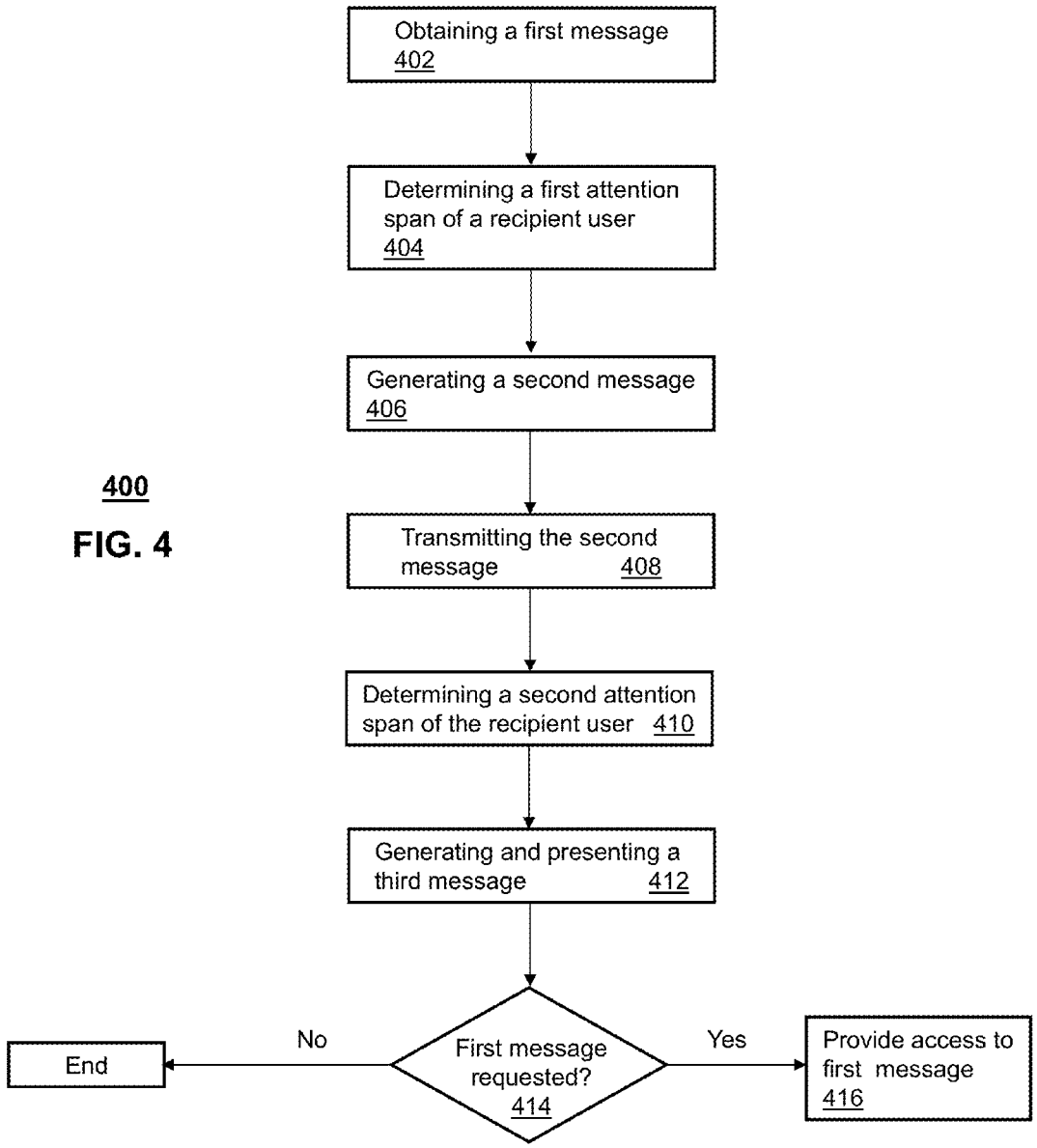
FIG. 4 depicts an illustrative embodiment of a method used in portions of the systems described in FIGS. 1-3.

FIG. 4 depicts an illustrative embodiment of a method 400 used by systems 100, 200 and/or 300 for management of messages. Various steps in method 400 can be executed by various devices and combinations of devices, including a sending device, a network server and/or a receiving device. At 402, a first message can be obtained. For example, user input can be received by a sending device where the user input includes the first message and identification information associated with a recipient that is intended to receive the first message.

At 404, data can be obtained for use in determining adjustments to be made to the first message. In one embodiment, the data can be obtained in order to determine a first attention span of the recipient. The data can be used for other purposes, including determining whether or not particular terms should or should not be included in the message. In one embodiment, activity information and/or presence information can be obtained that are associated with the recipient. For instance, the sending device can receive presence information and/or activity information from devices of the recipient in response to requests for this information being transmitted by the sending device. In another embodiment, a network device can monitor (e.g., pursuant to authorization from the recipient) activity information and/or presence information for the recipient and can provide this information to the sending device. In one embodiment, the activity information and/or presence information can be provided to the sending device but is not presented or otherwise accessible to the sender (e.g., securely stored at the sending device for use in an analysis by the sending device without being presented at the sending device).

At 406, a second message can be generated by adjusting the first message. For example, the first message can be adjusted according to the determined first attention span. For instance, portions of text, audio and/or video can be removed, replaced and/or added to the first message to generate the second message.

At 408, the generated second message can be transmitted to a receiving device associated with the recipient or otherwise distributed so as to be accessible to the recipient (e.g., transmitted to a network mailbox that is accessible via a pull technique by the recipient or posted to a social network website accessible to the recipient). In one embodiment, a particular receiving device(s) from among a group of devices of the recipient can be selected according to presence information for the recipient.

In one embodiment at 410, the receiving device can obtain data for use in determining adjustments to be made to the second message. The data obtained by the receiving device may or may not be the same as the data obtained by the sending device (which was utilized at 404 for determining the first attention span of the recipient). As an example, the receiving device of the recipient may have access to more information for a more accurate determination of the recipient's attention span than does the sending device, including a more accurate assessment of active communication sessions, other messaging, scheduled activities and so forth. The data obtained by the receiving device can also be used for other purposes, including determining whether or not particular terms should or should not be included in the message. At 412, the receiving device can generate a third message by adjusting the second message according to the second attention span determined by the receiving device for the recipient, which can then be presented at the receiving device.

Method 400 can also provide the receiving device with access to the first message. For example, at 414, the receiving device can monitor for a request (e.g., user input) requesting to see the first message. At 416, access to the first message can be provided, such as transmitting a request to the sending device to transmit the first message in its entirety (prior to being adjusted into the second message). Other techniques for providing access to the first message can be utilized, including network storage of the first message which is accessible to the receiving device.

While for purposes of simplicity of explanation, the respective processes are shown and described as a series of blocks in FIG. 4, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 5:
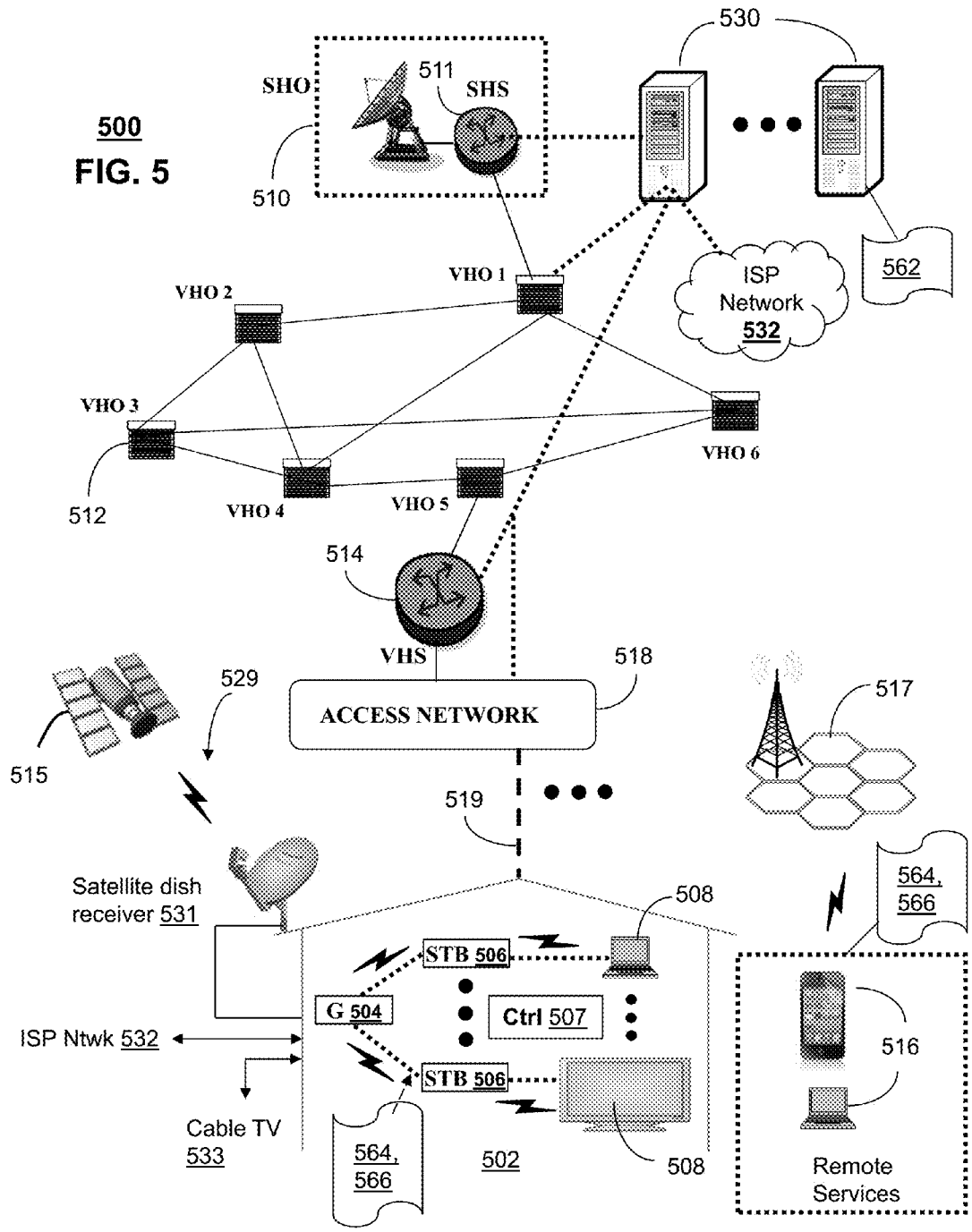
FIG. 5 depicts an illustrative embodiment of a communication system that provides media services including adjustment, storage and distribution of messages.

FIG. 5 depicts an illustrative embodiment of a first communication system 500 for delivering content which can include messages, audio, video and/or data. The communication system 500 can represent an interactive television system including an Internet Protocol Television (IPTV) media system. Communication system 500 can be overlaid or operably coupled with systems 100, 200, 300 as another representative embodiment of communication system 500. For instance, one or more devices illustrated in the communication system 500 of FIG. 5 can translate messages into a precise communication for delivery to a recipient(s), including determining characteristics of the recipient including attention span, reading comprehension, presence, and/or current activity level; analyzing the message to convert it into a succinct message that may or may not utilize the same terms; and/or delivering the succinct message to the recipient in a format most likely to be consumed by the recipient. These functions can be performed by various devices including a sending device, a network device and/or a receiving device (or can be distributed in more than one). In one embodiment, the receiving device can also access the full message after consuming the succinct message. In one embodiment, a sending device (or other device performing message adjustment) can perform an authorized monitoring of a recipient's history of accepting/consuming succinct messages and can use terms from those succinct messages. In one embodiment, the sending device (or other device performing message adjustment) can monitor the accuracy of the conversion to the succinct message, such as based on feedback from the sender and/or the recipient.

The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 housing a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as Set-Top Boxes (STBs) which in turn present broadcast channels to media devices 508 such as computers or television sets managed in some instances by a media controller 507 (such as an infrared or RF remote controller).

The gateway 504, the media processors 506, and media devices 508 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can be used in the media system of FIG. 5. The satellite broadcast television system can be overlaid, operably coupled with, or replace the IPTV system as another representative embodiment of communication system 500. In this embodiment, signals transmitted by a satellite 515 that include media content can be received by a satellite dish receiver 531 coupled to the building 502. Modulated signals received by the satellite dish receiver 531 can be transferred to the media processors 506 for demodulating, decoding, encoding, and/or distributing broadcast channels to the media devices 508. The media processors 506 can be equipped with a broadband port to an Internet Service Provider (ISP) network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services. System 500 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 530, a portion of which can operate as a web server for providing web portal services over the ISP network 532 to wireline media devices 508 or wireless communication devices 516.

Communication system 500 can also provide for all or a portion of the computing devices 530 to function as a message conversion server (herein referred to as server 530). The server 530 can use computing and communication technology to perform function 562, which can include: receiving a first message and identification information associated with a recipient user that is intended to receive the first message; obtaining network status information indicating network conditions for communications directed towards a receiving device of the recipient user; obtaining activity information associated with the recipient user; determining a first attention span of the recipient user according to the activity information; generating a second message by adjusting the first message according to the first attention span; selecting a format for the second message according to the network conditions; and transmitting the second message to the receiving device to enable the receiving device to generate a third message by adjusting the second message according to a second attention span determined by the receiving device for the recipient user.

The media processors 506 and wireless communication devices 516 can be provisioned with software functions 564 and 566, respectively, to utilize the services of server 530. For instance, functions 564 and 566 of media processors 506 and wireless communication devices 516 can be similar to the functions described for the sending and receiving communication devices 106, 116 in accordance with method 400. For example, function 564 can include receiving user input including a first message and identification information associated with a recipient user that is intended to receive the first message; obtaining activity information and presence information associated with the recipient user; determining a first attention span of the recipient user according to the activity information; generating a second message by adjusting the first message according to the first attention span; selecting a receiving device from among a group of devices according to the presence information; and/or transmitting the second message to the receiving device to enable the receiving device to generate a third message by adjusting the second message according to a second attention span determined by the receiving device for the recipient user, where the third message is presentable by the receiving device.

For example, function 566 can include receiving a second message that is generated from user input, activity information, and a first attention span, where the user input is received at a sending device and includes a first message, where the activity information is associated with a recipient user of the receiving device, where the first attention span is determined for the recipient user according to the activity information, and where the first message is adjusted into the second message according to the first attention span; receiving metadata representing changes made to the first message in the generating of the second message; determining a second attention span for the recipient user; generating a third message by adjusting the second message according to the second attention span and the metadata; and/or presenting the third message.

Multiple forms of media services can be offered to media devices over landline technologies such as those described above. Additionally, media services can be offered to media devices by way of a wireless access base station 517 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 6:
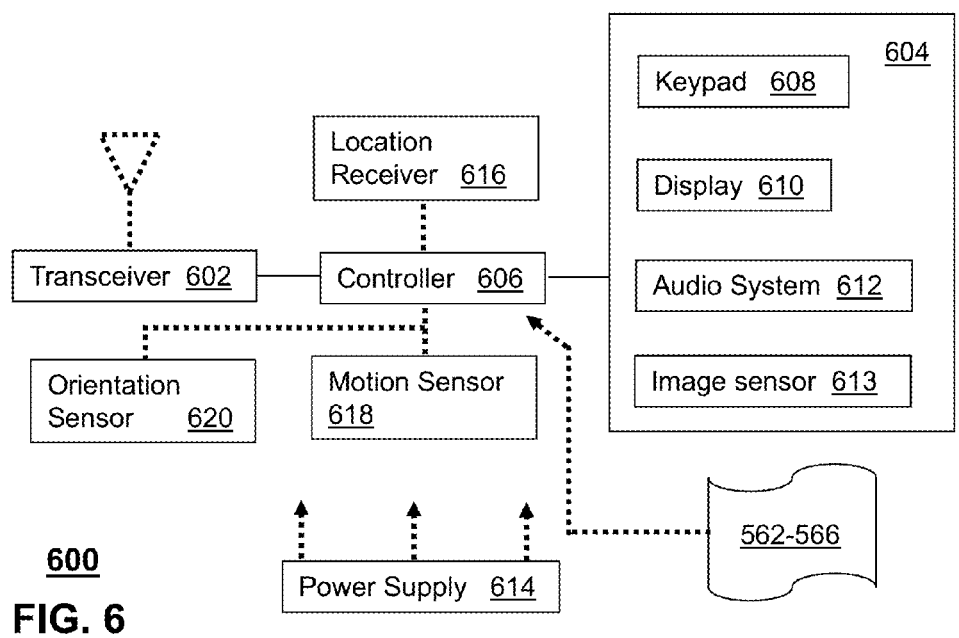
FIG. 6 depicts an illustrative embodiment of a communication device for adjusting and delivering messages.

FIG. 6 depicts an illustrative embodiment of a communication device 600. Communication device 600 can serve in whole or in part as an illustrative embodiment of the devices depicted in systems 100, 200, 300, 500 and can be configured to perform portions of method 500 of FIG. 5. As an example, device 600 can communicate messages to recipients where the messages are in a desired form based on the particular circumstances, including changing format, changing words, and/or otherwise adjusting the message based on various factors. The modification of the message(s) can be performed by various devices or combinations of devices, including the sending device, the receiving device and/or a network device(s).

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of devices 106, 116, 230, the media processor 506, the media devices 508, the portable communication devices 516 and/or the server 530. It will be appreciated that the communication device 600 can also represent other devices that can operate in systems 100, 200, 300, 500, such as a gaming console and a media player. In addition, the controller 606 can be adapted in various embodiments to perform the functions 562, 564, 566, respectively.

Upon reviewing the aforementioned embodiments, it would be evident to an artisan with ordinary skill in the art that said embodiments can be modified, reduced, or enhanced without departing from the scope of the claims described below. For example, an adjusted message can include a link to a memory that stores the original message. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
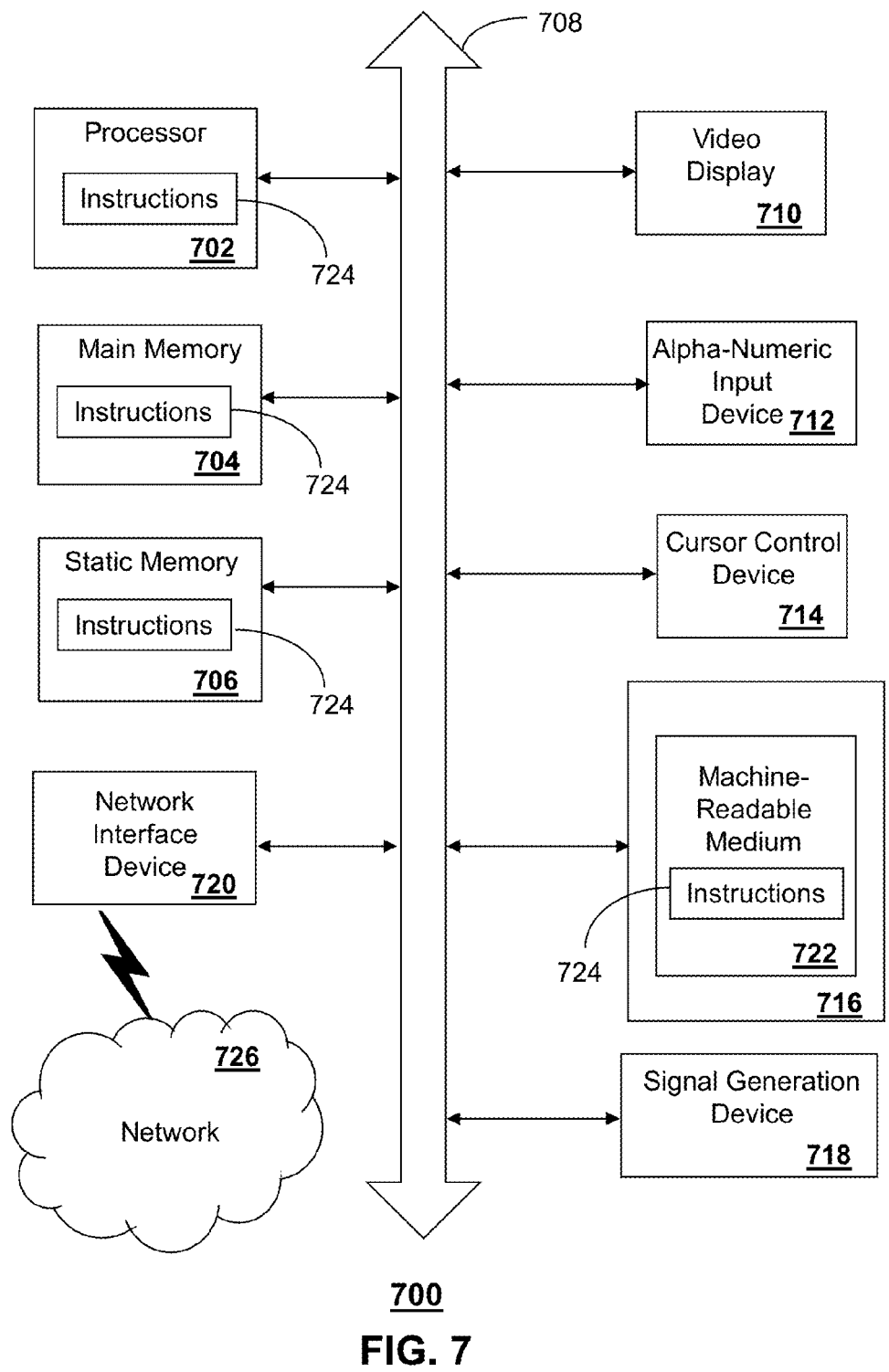
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the server 530, the media processor 506 and other devices of FIGS. 1-3 and 5-6 to enable adjustment of messages with or without user intervention in the adjustment. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A sending device, comprising:
a processing system including a processor; and
a memory that stores executable instructions that, when executed by the processor, facilitate performance of operations, comprising:
receiving user input including a first message and identification information associated with a recipient user that is intended to receive the first message, wherein the first message comprises a text message;
obtaining activity information and presence information associated with the recipient user;
determining a first attention span of the recipient user according to the activity information;
detecting network traffic for a communication network communicatively coupled to the sending device;
generating a second message by adjusting the first message according to the first attention span and the network traffic, wherein the second message comprises a video message;
selecting a receiving device from among a group of devices according to the presence information; and
transmitting the second message to a server hosting a social network website, wherein the second message is accessed, via the social network website, by the receiving device to enable the receiving device to generate a third message by adjusting the second message according to a second attention span and significance of content in one of the first message and the second message determined by the receiving device for the recipient user, wherein the adjusting of the second message to generate the third message comprises removing content from the second message and adding content from the first message, wherein the third message is presentable by the receiving device, wherein the third message comprises an audio message.

2. The sending device of claim 1, wherein the generating of the second message is performed without receiving additional user input and by adjusting the first message according to words utilized in a previous message received from the receiving device, and wherein the selecting of the receiving device is based on the activity information.

3. The sending device of claim 2, wherein the operations further comprise selecting a format for the second message according to the activity information resulting in a selected format, wherein the transmitting of the second message to the receiving device is in the selected format.

4. The sending device of claim 3, wherein the format is selected from audio, video and text.

5. The sending device of claim 1, wherein the operations further comprise providing access data to the receiving device that enables the receiving device to access the first message.

6. The sending device of claim 5, wherein the operations further comprise:
responsive to the access data, receiving a request from the receiving device to access the first message; and transmitting the first message to the receiving device responsive to the request.

7. The sending device of claim 1, wherein the obtaining of the activity information includes obtaining calendar information for an electronic calendar associated with the recipient user.

8. The sending device of claim 1, wherein the obtaining of the activity information includes detecting an active communication session in which one of the group of devices is participating.

9. The sending device of claim 1, wherein the generating of the third message by the receiving device is performed without receiving recipient user input.

10. The sending device of claim 1, wherein the generating of the second message includes adjusting the first message according to words utilized in a previous message transmitted by the sending device to the receiving device.

11. The sending device of claim 1, wherein the operations further comprise:
generating metadata representing changes made to the first message in the generating of the second message; and
transmitting the metadata to the receiving device, wherein the generating of the third message by the receiving device is based on the metadata.

12. A method comprising:
receiving, by a network server comprising a processor from a sending device, a first message and identification information associated with a recipient user that is intended to receive the first message, wherein the first message comprises a text message;
obtaining, by the network server, network status information indicating network conditions for communications directed towards a receiving device of the recipient user;
obtaining, by the network server, activity information associated with the recipient user;
determining, by the network server, a first attention span of the recipient user according to the activity information;
detecting network traffic for a communication network between the network server and the receiving device;
generating, by the network server, a second message by adjusting the first message according to the first attention span and the network traffic, wherein the second message comprises a video message;
selecting, by the network server, a format for the second message according to the network conditions resulting in a selected format; and
transmitting, by the network server, the second message to a server hosting a social network website, wherein the second message is accessed, via the social network website, by the receiving device to enable the receiving device to generate a third message by adjusting the second message according to a second attention span and significance of content in one of the first message and the second message determined by the receiving device for the recipient user, wherein the adjusting of the second message to generate the third message comprises removing content from the second message and adding content from the first message, wherein the third message is presentable by the receiving device, wherein the third message comprises an audio message, and wherein the transmitting of the second message to the receiving device is in the selected format.

13. The method of claim 12, comprising:
generating, by the network server, metadata representing changes made to the first message in the generating of the second message; and
transmitting, by the network server, the metadata to the receiving device, wherein the generating of the third message by the receiving device is based on the metadata.

14. The method of claim 12, comprising:
providing, by the network server to the receiving device, access data indicating available access to the first message;
responsive to the access data, receiving, by the network server, a request from the receiving device to access the first message; and
transmitting, by the network server, the first message to the receiving device responsive to the request.

15. The method of claim 12, wherein the generating of the second message includes adjusting the first message according to words utilized in a previous message transmitted by the sending device to the receiving device.

16. The method of claim 12, wherein the obtaining of the activity information includes obtaining calendar information for an electronic calendar associated with the recipient user and monitoring for an active communication session associated with equipment of the recipient user.

17. A non-transitory machine-readable storage medium, comprising executable instructions that, when executed by a processing system including a processor of a receiving device, facilitate performance of operations, comprising:
receiving a second message that is generated from user input, activity information, and a first attention span, wherein the user input is received at a sending device and includes a first message, wherein the activity information is associated with a recipient user of the receiving device, wherein the first attention span is determined for the recipient user according to the activity information, wherein network traffic for a communication network between the sending device and the receiving device is detected, and wherein the first message is adjusted into the second message according to the first attention span and the network traffic, wherein the first message comprises a text message and the second message comprises a video message, wherein the sending device transmits the second message to a server hosting a social network website, and wherein the second message is accessed, via the social network website, by the receiving device;
receiving metadata representing changes made to the first message in the generating of the second message;
determining a second attention span for the recipient user;
generating a third message by adjusting the second message according to the second attention span, the metadata, and significance of content in one of the first message and the second message, wherein the adjusting of the second message to generate the third message comprises removing content from the second message and adding content from the first message, wherein the third message comprises an audio message; and
presenting the third message.

18. The non-transitory machine-readable storage medium of claim 17, wherein the operations further comprise:
obtaining calendar information for an electronic calendar associated with the recipient user; and
monitoring for an active communication session associated with equipment of the recipient user,
wherein the determining of the second attention span is based on the calendar information and the monitoring.

19. The non-transitory machine-readable storage medium of claim 17, wherein the generating of the third message includes adjusting the second message according to words utilized in a previous message transmitted by the receiving device to the sending device.

20. The non-transitory machine-readable storage medium of claim 17, wherein the operations further comprise selecting a format for the third message.

\* \* \* \* \*